(12) United States Patent
Matsubara et al.

(10) Patent No.: US 10,753,004 B2
(45) Date of Patent: Aug. 25, 2020

(54) ELECTROLYTIC CHLORINE DIOXIDE GAS MANUFACTURING DEVICE

(71) Applicant: Taiko Pharmaceutical Co., Ltd., Osaka (JP)

(72) Inventors: Kazuki Matsubara, Osaka (JP); Yasuhiro Takigawa, Osaka (JP); Kazuhiko Taguchi, Osaka (JP); Shigeo Asada, Osaka (JP); Kouichi Taura, Osaka (JP); Koichi Nakahara, Osaka (JP); Daisuke Kato, Osaka (JP)

(73) Assignee: Taiko Pharmaceuticals Co., Ltd., Osaka (JP)

( * ) Notice: Subject to any disclaimer, the term of this patent is extended or adjusted under 35 U.S.C. 154(b) by 421 days.

(21) Appl. No.: 15/508,047

(22) PCT Filed: Aug. 31, 2015

(86) PCT No.: PCT/JP2015/074567
§ 371 (c)(1),
(2) Date: Mar. 1, 2017

(87) PCT Pub. No.: WO2016/039190
PCT Pub. Date: Mar. 17, 2016

(65) Prior Publication Data
US 2017/0253980 A1    Sep. 7, 2017

(30) Foreign Application Priority Data
Sep. 8, 2014    (JP) .................................. 2014-182164

(51) Int. Cl.
*C25B 1/00*        (2006.01)
*C25B 15/00*       (2006.01)
(Continued)

(52) U.S. Cl.
CPC ............... *C25B 1/26* (2013.01); *C25B 9/02* (2013.01); *C25B 9/06* (2013.01); *C25B 9/08* (2013.01); *C25B 15/02* (2013.01); *C01B 11/022* (2013.01)

(58) Field of Classification Search
CPC .. C25B 1/00; C25B 1/26; C25B 15/00; C25B 9/00; C25B 9/18; C25B 9/06
(Continued)

(56) References Cited

U.S. PATENT DOCUMENTS 7,736,776 B1 *   6/2010   Spielman ............... C02F 1/4618
                                                  210/748.01
2011/0100833 A1 *  5/2011  Asada ........................ C25B 1/26
                                                       205/351

FOREIGN PATENT DOCUMENTS

JP        S57-111866 U      7/1982
JP         9-279376 A      10/1997
(Continued)

OTHER PUBLICATIONS

International Search Report issued in PCT/JP2015/074567, dated Dec. 1, 2015 (2 pages).
(Continued)

*Primary Examiner* — Zulmariam Mendez
(74) *Attorney, Agent, or Firm* — Osha Liang LLP

(57) ABSTRACT

The present invention provides a chlorine dioxide manufacturing device that can accurately control the amount of chlorine dioxide produced. The present invention provides a chlorine dioxide gas manufacturing device comprising an electrolysis chamber, a liquid surface level measuring chamber, and a bubbling gas feeding device. The electrolysis chamber and the liquid surface level measuring chamber each comprises an electrolytic solution and a gas and the electrolysis chamber and the liquid surface level measuring chamber are joined to each other above each liquid surface (Continued)

via a gas piping and joined to each other below each liquid surface via an electrolytic solution piping so that the height of the electrolytic solutions contained in each chamber are substantially equal.

8 Claims, 7 Drawing Sheets

(51) Int. Cl.
    *C25B 9/18*    (2006.01)
    *C25B 1/26*    (2006.01)
    *C25B 9/02*    (2006.01)
    *C25B 9/06*    (2006.01)
    *C25B 9/08*    (2006.01)
    *C25B 15/02*   (2006.01)
    *C01B 11/02*   (2006.01)

(58) Field of Classification Search
    USPC ..................................................... 204/265
    See application file for complete search history.

(56) References Cited

FOREIGN PATENT DOCUMENTS

| | | |
|---|---|---|
| JP | H09-329571 A | 12/1997 |
| JP | 2001-347135 A | 12/2001 |
| JP | 2008-240030 A | 10/2008 |
| JP | 2009-022905 A | 2/2009 |
| WO | 2009/154143 A1 | 12/2009 |

OTHER PUBLICATIONS

Written Opinion of the International Searching Authority issued in PCT/JP20151074567, dated Dec. 1, 2015 (4 pages).
C. B. Smith, "Energy saving technology," Mechanical Industry Press, p. 356, 1987 (1 page).
Notice of Reasons for Refusal (Office Action) dated May 20, 2019, by the Japan Patent Office in corresponding Japanese Patent Application No. 2016-547379, with Global Dossier English translation (15 pages).

\* cited by examiner

ELECTROLYTIC CHLORINE DIOXIDE GAS MANUFACTURING DEVICE

TECHNICAL FIELD

The present invention relates an electrolytic chlorine dioxide gas manufacturing device.

BACKGROUND ART

While chlorine dioxide gas is a gas that is safe to a living animal body at a low concentration (such as 0.1 ppm or less), it is known to have effects such as inactivation or deodorization against microorganisms such as bacteria, fungus, and virus even at such a low concentration.

A method for manufacturing chlorine dioxide by electrolyzing an electrolytic solution comprising a chlorite is known (Patent Literature 1). However, in the chlorine dioxide manufacturing method described in Patent Literature 1, there was a problem that since the pH of the electrolytic solution gradually increases when electrolysis is continuously performed, the electrolysis efficiency (production efficiency of chlorine dioxide) was reduced, and when an acid was added to reduce the pH, the storage stability of the electrolytic solution would be lost and the electrolytic solution will deteriorate over time. In order to solve this problem, a method for producing chlorine dioxide gas by performing electrolysis while maintaining the pH of the electrolytic solution during electrolysis at pH 4-8 has been proposed (Patent Literature 2).

CITATION LIST

[Patent Literature 1] Japanese Published Unexamined Patent Application Publication No. Hei-9-279376 Publication
[Patent Literature 2] WO 2009/154143

SUMMARY OF THE INVENTION

Problems to be Solved by the Invention

The chlorine dioxide gas production method described in Patent Literature 2 can produce chlorine dioxide gas for a long period at high efficiency compared to the conventional chlorine dioxide gas production method. However, the present inventors noticed a problem that even though chlorine dioxide gas is a gas safe to a living animal body at a low concentration, it may become harmful to a living animal body at a high concentration, and therefore in order to make practical use of said chlorine dioxide gas production method, a chlorine dioxide gas manufacturing device that can accurately control the amount of chlorine dioxide produced is necessary.

Means for Solving the Problems

In the manufacture of chlorine dioxide with a conventional electrolysis device (such as the electrolytic cell exemplified in Patent Literature 2), an electrolytic solution comprising a chlorite was electrolyzed and then the chlorine dioxide gas is taken out by bubbling air and inactivated gas etc. through the electrolytic solution, but the electrolysis efficiency was reduced by attachment of said bubbles to the electrodes and it was difficult to control the amount of chlorine dioxide produced. Moreover, since the liquid surface of the electrolytic solution was always continuously shaken due to said bubbling, it was difficult to accurately monitor the liquid surface level, and hence it was difficult to accurately control the liquid amount of the electrolytic solution.

As a result of repeated extensive investigation, the present inventors found that the amount of chlorine dioxide produced can be accurately controlled by having an electrolysis device with the following configuration to thus arrive at the completion of the present invention.

In other words, the present invention provides a chlorine dioxide gas manufacturing device, characterized in that said device comprises an electrolysis chamber, a liquid surface level measuring chamber, and a bubbling gas feeding device, said electrolysis chamber and said liquid surface level measuring chamber each comprises an electrolytic solution and a gas, wherein the electrolytic solution comprises an aqueous chlorite solution, said electrolysis chamber and said liquid surface level measuring chamber are joined to each other above each liquid surface via a gas piping and joined to each other below each liquid surface via an electrolytic solution piping so that the height of the electrolytic solutions contained in each chamber are substantially equal, said electrolysis chamber comprises a cathode and an anode, wherein said cathode and anode are fixed to a spacer, said electrolysis chamber comprises a bubbling gas feed section in the electrolytic solution for feeding gas by bubbling from outside of said electrolysis chamber to the electrolytic solution in said electrolysis chamber, wherein said bubbling gas feed section is connected via a piping to said bubbling gas feeding device placed outside of said electrolysis chamber, and said liquid surface level measuring chamber comprises a means for measuring the liquid surface level.

Note that since the "bubbling gas feed section" herein is also a section for discharging the gas fed from the bubbling gas feeding device, in this regard may also be referred to as a "bubbling gas discharge section".

One embodiment of the present invention is characterized in that said bubbling gas feed section is placed below said spacer, and said spacer is configured so as to prevent the bubbled gas from approaching said cathode and said anode at the bottom portion thereof.

One embodiment of the present invention is characterized in that said spacer retains a predetermined interval between said cathode and said anode.

One embodiment of the present invention is characterized in that said predetermined interval is 1 mm-50 mm.

One embodiment of the present invention is characterized in that said means for measuring the liquid surface level comprises at least two or more electrodes having lengths that differ from each other, and a device for verifying whether each electrode is exposed to the liquid surface by measuring the electric current between said differing electrodes.

One embodiment of the present invention is characterized in that said manufacturing device further comprises an electrolytic solution feed tank, and
said electrolysis chamber is connected to said electrolytic solution feed tank via an electrolytic solution feed pipe.

One embodiment of the present invention is characterized in that said manufacturing device further comprises an electrolytic solution discharge tank, and
said electrolysis chamber and/or liquid surface level measuring chamber is connected to said electrolytic solution discharge tank below the liquid surface via an electrolytic solution discharge pipe.

One embodiment of the present invention is characterized in that said manufacturing device further comprises a chlorine dioxide gas blower fan, and said electrolysis chamber and/or liquid surface level measuring chamber is connected to said chlorine dioxide gas blower fan above the liquid surface via a chlorine dioxide gas release pipe.

Another embodiment of the present invention provides a chlorine dioxide gas manufacturing device, characterized in that said device comprises an electrolysis chamber, a liquid surface level measuring chamber, a bubbling chamber, and a bubbling gas feeding device, said electrolysis chamber, said liquid surface level measuring chamber, and said bubbling chamber comprises each of an electrolytic solution and a gas (gas above the electrolytic solution), wherein the electrolytic solution comprises an aqueous chlorite solution, said electrolysis chamber, said liquid surface level measuring chamber, and said bubbling chamber are directly or indirectly joined to each other above each liquid surface via a gas piping and directly or indirectly joined to each other below each liquid surface via an electrolytic solution piping so that the height of the electrolytic solutions contained in each chamber are substantially equal, said electrolysis chamber comprises a cathode and an anode, wherein said cathode and anode are fixed to a spacer, said bubbling chamber comprises a bubbling gas feed section in the electrolytic solution for feeding gas by bubbling from outside of said bubbling chamber to the electrolytic solution in said bubbling chamber, wherein said bubbling gas feed section is connected via a piping to said bubbling gas feeding device placed outside of said bubbling chamber, and said liquid surface level measuring chamber comprises a means for measuring the liquid surface level.

One embodiment of the present invention is characterized in that said manufacturing device further comprises an electrolytic solution feed tank, and said electrolysis chamber is connected to said electrolytic solution feed tank via an electrolytic solution feed pipe.

One embodiment of the present invention is characterized in that said manufacturing device further comprises an electrolytic solution discharge tank, and at least one of said electrolysis chamber, the liquid surface level measuring chamber, and said bubbling chamber is connected to said electrolytic solution discharge tank below the liquid surface via an electrolytic solution discharge pipe.

One embodiment of the present invention is characterized in that said manufacturing device further comprises a chlorine dioxide gas blower fan, and at least one of said electrolysis chamber, the liquid surface level measuring chamber, and said bubbling chamber is connected to said chlorine dioxide gas blower fan above the liquid surface via a chlorine dioxide gas release pipe.

One embodiment of the present invention is further characterized in that said electrolysis chamber comprises a bubbling gas feed section in the electrolytic solution for feeding gas by bubbling from outside of said electrolysis chamber to the electrolytic solution in said electrolysis chamber, wherein said bubbling gas feed section is connected via a piping to said bubbling gas feeding device placed outside of said electrolysis chamber.

One embodiment of the present invention is characterized in that said bubbling gas feed section installed in said electrolysis chamber is placed below said spacer, and said spacer is configured so as to prevent the gas bubbled from said bubbling gas feed section installed in said electrolysis chamber from approaching said cathode and said anode at bottom portion thereof.

One embodiment of the present invention is characterized in that a barrier membrane does not exist between said cathode and said anode.

An invention of any combination of one or more characteristics of the present invention above is also encompassed by the scope of the present invention.

DESCRIPTION OF EMBODIMENTS

Figure 1:
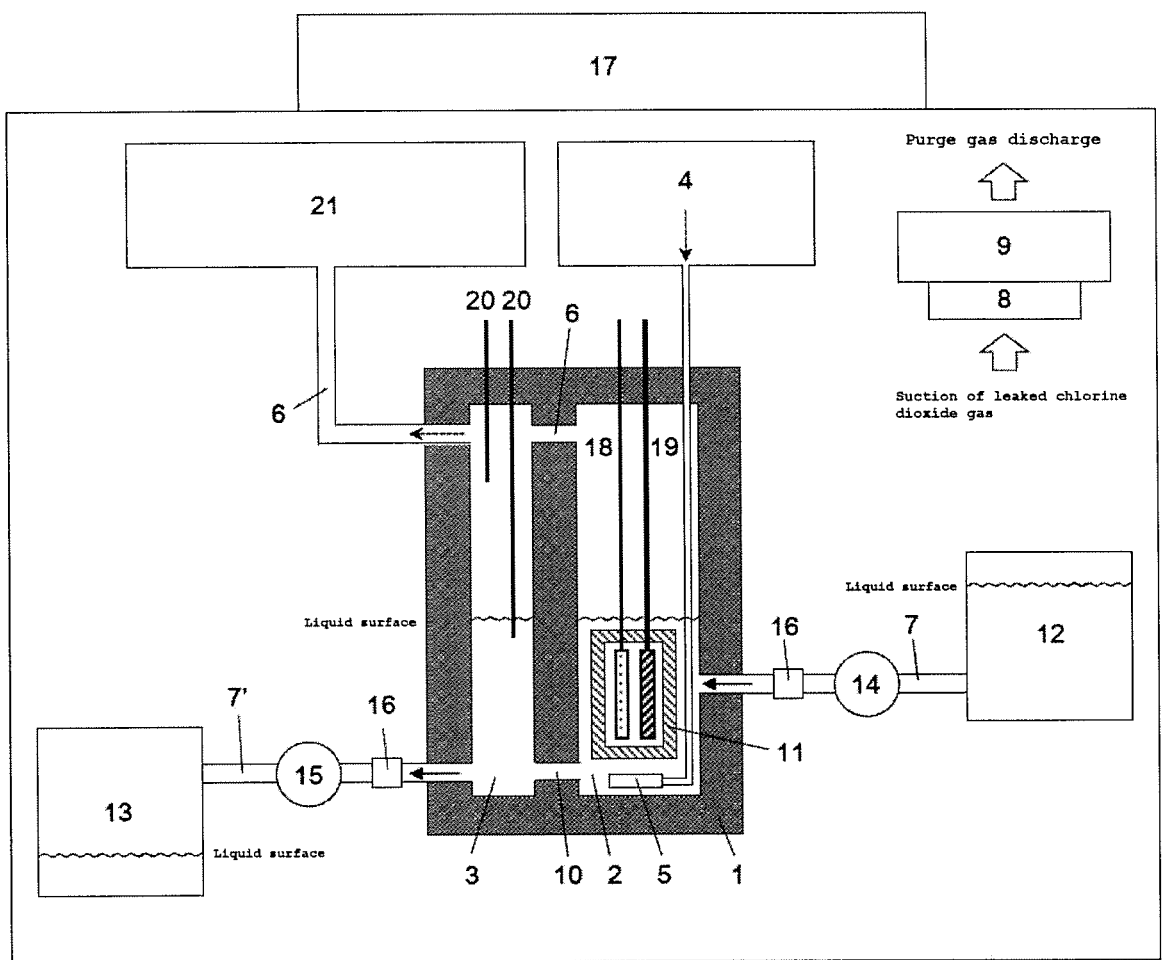
FIG. 1 shows the schematic diagram of the chlorine dioxide gas manufacturing device which is one embodiment of the present invention.

The chlorine dioxide gas manufacturing device of the present invention may be substantially a device for manufacturing chlorine dioxide, and does not intend to exclude those that produce another substance simultaneously with the production of chlorine dioxide.

The chlorine dioxide gas manufacturing device of the present invention comprises an electrolysis chamber, a liquid surface level measuring chamber, and a bubbling gas feeding device, and may further comprise a bubbling chamber. For example, it may be a chlorine dioxide gas manufacturing device comprising the two chambers of an electrolysis chamber and a liquid surface level measuring chamber, or it may be a chlorine dioxide gas manufacturing device comprising the three chambers of an electrolysis chamber, a liquid surface level measuring chamber, and a bubbling chamber. Moreover, for example, the electrolysis chamber, the liquid surface level measuring chamber, the bubbling chamber, and/or at least one chamber employed for another application may be further added to have four chambers or more. Each chamber comprises an electrolytic solution and a gas (gas above the electrolytic solution), and they are joined to each other above each liquid surface via a gas piping and joined to each other below each liquid surface via an electrolytic solution piping so that the height of the electrolytic solutions contained in each chamber are substantially equal. In a chlorine dioxide gas manufacturing device comprising three chambers or more including the electrolysis chamber, the liquid surface level measuring chamber, and the bubbling chamber, the aspect of the joining of each chamber is not limited, and may be directly or indirectly joined to each other above each liquid surface via a gas piping and directly or indirectly joined to each other below each liquid surface via an electrolytic solution piping so that the height of the electrolytic solutions contained in each chamber are substantially equal. Note that the type of the gas that is present above the electrolytic solution in each chamber is not particularly limited, and it is preferred that it is a gas that does not chemically react with chlorine dioxide gas.

The electrolysis chamber in the chlorine dioxide gas manufacturing device of the present invention is not particularly limited as long as it can electrolyze a solution comprising a chlorite, and it is preferably an electrolysis chamber without a barrier membrane comprising a cathode and an anode. Note that an "electrolysis chamber without a barrier membrane" herein refers to a one-solution electrolysis chamber where the electrolytic solution on the cathode side and the electrolytic solution on the anode side are not separated by a barrier membrane.

Those conventional well-known may be used as the electrode used for electrolysis, and an electrode that keeps oxygen gas production to a minimum, keeps good chlorine gas production, and can efficiently produce chlorine dioxide are favorably employed. For example, cathode materials include titanium, stainless steel, nickel, nickel/chromium alloy, or other valve metals. Moreover, anode materials include an electrode composed of platinum, gold, palladium, noble metals such as iridium, rhodium, or ruthenium, graphite, graphite felt, multilayered graphite cloth, graphite textile fabric, carbon, or a platinum-coated material having platinum plated onto titanium, an oxide of a valve metal such as titanium, tantalum, niobium, or zirconium and the like, and those having an electrode catalyst coated are favorably employed.

Note that increasing the electrode area and decreasing the electric current density is preferred in regards to efficiently producing chlorine dioxide. Specifically, 1 A/dm$^2$ or less is preferred, 0.8 A/dm$^2$ or less is further preferred, and 0.6 A/dm$^2$ or less is further preferred.

Moreover, in one embodiment of the present invention, the electrolytic current value may be measured with the cathode and the anode of the electrolysis chamber. According to Faraday's law of electrolysis, the amount of chlorine dioxide produced and the electrolytic current value during electrolysis reaction will always be in a proportional relationship. In other words, by monitoring the electrolytic current value in the electrolysis chamber, the amount of chlorine dioxide produced can be indirectly estimated. For example, when the electrolytic current value is reduced, it is estimated that the amount of chlorine dioxide produced is reduced because the chlorite in the electrolytic solution is consumed by electrolysis and the chlorite concentration in the electrolytic solution is reduced. Accordingly, improvement of the amount of chlorine dioxide produced can be attempted by feeding new electrolytic solution.

The electrolytic solution employed in the chlorine dioxide gas manufacturing device of the present invention is not limited as long as it comprises a chlorite, and in particular, those that comprise a chlorite, an alkali chloride, and a pH adjustor are favorably employed.

Examples of the chlorite used in the present invention include alkali metal chlorites or alkaline earth metal chlorites. Examples of an alkali metal chlorite include sodium chlorite, potassium chlorite, and lithium chlorite, and an alkaline earth metal chlorite includes calcium chlorite, magnesium chlorite, and barium chlorite. Among these, in terms of easy availability, sodium chlorite and potassium chlorite are preferred, and sodium chlorite is most preferred. These alkali chlorites may be employed alone or two or more may be used in combination. The proportion of the alkali chlorite in the electrolytic solution is preferably 0.1% by weight- 30% by weight. When it is less than 0.1% by weight, there is a possibility of causing a problem that the alkali chlorite necessary for the electrolytic solution is not fed, and when it is more than 30% by weight, there is a possibility of causing a problem of the alkali chlorite being saturated and crystals being easily precipitated. In light of safety or stability, as well as production efficiency of chlorine dioxide and the like, a further preferred range is 1% by weight-10% by weight, and a further preferred range is 1% by weight-3% by weight.

Examples of the alkali chloride used in the present invention include potassium chloride, sodium chloride, lithium chloride, calcium chloride, and the like. These may be used alone, or more than one can also be used in combination. The proportion of the alkali chloride in the electrolytic solution is preferably 1% by weight or more, and further preferably 2% by weight or more (less than the solubility). When it is less than 1% by weight, there is a possibility that chlorine gas cannot be stably produced and it will pose a problem for chlorine dioxide production. Increasing the alkali chloride concentration in the electrolytic solution is preferred in teams of being able to efficiently produce chlorine dioxide, but when it is higher than the solubility, the alkali chloride will precipitate in the electrolytic solution and have a negative effect. For this reason, the proportion of the alkali chloride in the electrolytic solution is preferably 20% by weight or less.

Examples of the pH adjustor used in the present invention include citric acid, fumaric acid, formic acid, lactic acid, phosphoric acid, an alkali dihydrogenphosphate salt (such as sodium or potassium salts), a dialkali hydrogenphosphate salt (such as sodium or potassium salts), tartaric acid, butyric acid, and the like. These may be employed alone, or two or more may be used in combination. The proportion of the pH adjustor in the electrolytic solution can be appropriately adjusted by those skilled in the art depending on the type or solubility of the acid used (acidic substance, described below) or the solubility of the compound to be purified by electrolysis. In other words, how the acid used (acidic substance, described below) neutralizes the alkali hydroxide produced from electrolysis is determined from chemical formula, the amount necessary is calculated from the chemical formula used for determining, and the amount of acid appropriate thereto can be used. For example, when the acid is potassium dihydrogenphosphate, the amounts will be potassium dihydrogenphosphate 1.5-2.3% by weight+dipotassium hydrogenphosphate 0.6-1.2% by weight, and when the acid is citric acid, the amounts will be citric acid 2.0-2.2% by weight+dipotassium hydrogenphosphate 6.5-7.0% by weight.

In the chlorine dioxide gas manufacturing device of the present invention, chlorine dioxide gas can be most efficiently produced by performing electrolysis while retaining the pH of the electrolytic solution at 4.0-9.0, preferably pH 5.0-8.5, and more preferably pH 5.8-8.0. In a state where the pH of the electrolytic solution is 4.0 or less (i.e. under acidic condition), chlorine dioxide will be produced by the chemical reaction between the chlorite and the acid even in a state where electrolysis is not performed, and thus control of chlorine dioxide production by will be difficult. Moreover, when chlorine dioxide is to be produced by electrolysis of the electrolytic solution, chlorine dioxide is produced by the chemical reactions of the following (1) by electrolysis of a chlorite and (2)-(3) caused by electrolysis of alkali chlorides.

$$ClO_2^- \rightarrow ClO_2 + e^- \quad (1)$$

$$2Cl^- \rightarrow Cl_2 + 2e^- \quad (2)$$

$$2ClO_2^- + Cl_2 \rightarrow 2ClO_2 + 2Cl^- \quad (3)$$

Since the reaction efficiency of the above (2)-(3) will be reduced as the pH increases, when electrolysis is performed in a state where the pH of the electrolytic solution is 9.0 or more, the production efficiency of chlorine dioxide in general will be reduced.

It is preferred that the electrolytic solution employed in the chlorine dioxide gas manufacturing device of the present invention is stored in a state where the pH is 8.0 or more (preferably pH 9.0 or more) before use of the device, and the pH of the electrolytic solution is made to 4.0-9.0 immediately before use of the device by adding an acidic substance. By storing the electrolytic solution comprising a chlorite in a state where the pH is 8.0 or more (preferably pH 9.0 or more), the reaction of the chlorite with the acid in the electrolytic solution can be prevented when electrolysis is not performed, and this can prevent the chlorite concentration in the electrolytic solution from decreasing.

Examples of the acidic substance used in the present invention include inorganic acids such as hydrochloric acid, sulfuric acid, sulfurous acid, thiosulfuric acid, nitric acid, nitrous acid, iodic acid, phosphoric acid, an alkali dihydrogenphosphate salt (such as sodium and potassium salts), phosphorous acid, sodium hydrogensulfate, potassium hydrogensulfate, and chromic acid, or organic acids such as formic acid, acetic acid, propionic acid, butyric acid, lactic acid, pyruvic acid, citric acid, malic acid, tartaric acid, gluconic acid, glycolic acid, fumaric acid, malonic acid, maleic acid, oxalic acid, succinic acid, acrylic acid, crotonic acid, oxalic acid, and glutaric acid. In terms of the stability of the electrolytic solution, it is desired to use an inorganic acid, more preferably to employ a phosphate salt, and most preferably to employ potassium dihydrogenphosphate salt. These acidic substances may be employed alone, or two or more may be used in combination. The acidic substance used in the present invention may be a solid acidic substance or an acidic substance in an aqueous solution state, and in term of avoiding undissolved residue in the electrolytic solution, an acidic substance in an aqueous solution is more preferred.

The chlorine dioxide gas manufacturing device of the present invention comprises a liquid surface level measurement device having a means for measuring the liquid surface level of the electrolytic solution. Those that are well-known to those skilled in the art can be employed for the "means for measuring the liquid surface level" herein, and for example it may be a means comprising at least two or more electrodes having lengths that differ from each other and a device for verifying whether each electrode is exposed to the liquid surface by measuring the electric current between said differing electrodes. When the electrode is exposed to the liquid surface, the electric current will no longer flow through said electrode, and it can be perceived that the liquid surface level is below the electrode. By increasing the number of electrodes employed for detecting of the liquid surface level to e.g. three, four, five, or more, the liquid surface level can be detected at multi-levels, and precise measurement of the liquid surface level is possible. Moreover, by accurately detecting the liquid surface level of the electrolytic solution, a state where the cathode and anode installed in the electrolysis chamber are exposed from the electrolytic solution can be prevented.

Note that the phrase "measuring the liquid surface level" herein is sometimes employed to mean "detecting the liquid surface level." Moreover, the term an "electrode for liquid surface level detection" herein is sometimes referred to as an "electrode for liquid surface level measurement."

The chlorine dioxide gas manufacturing device of the present invention comprises a bubbling gas feeding device. The bubbling gas feeding device is connected to the bubbling gas feed section installed in the electrolytic solution via a piping, and feeds air or inactivated gas (such as nitrogen, argon, etc.) from the bubbling gas feed section into the electrolytic solution. The chlorine dioxide produced by electrolysis in the electrolysis chamber dissolves immediately into the electrolytic solution, but can be easily taken out as chlorine dioxide gas by bubbling air or inactivated gas into said electrolytic solution. Moreover, by adjusting the amount of air flow per unit of time (flow rate) of the bubbling gas fed from the bubbling gas feeding device, the amount of chlorine dioxide gas that is taken out from the electrolytic solution as chlorine dioxide gas (gas concentration) can be adjusted. For example, when the amount of chlorine dioxide gas is to be increased, this can be achieved by increasing the flow rate of the bubbling gas fed from the bubbling gas feeding device, and when the amount of chlorine dioxide gas is to be decreased, this can be achieved by decreasing the flow rate of the bubbling gas fed from the bubbling gas feeding device.

The bubbling gas feeding device can be arbitrary selected by those skilled in the art as long as it has the function to feed air or inactivated gas into the electrolytic solution, and e.g. may be an air pump.

Because accurate detection of the liquid surface level is inhibited if the bubbling gas feed section is installed in the liquid surface level measuring chamber due to shaking of the liquid surface and chattering of the electrode for liquid surface level detection by bubbling, it is preferred that the bubbling gas feed section is installed other than in the liquid surface level measuring chamber.

The chlorine dioxide gas manufacturing device of the present invention may comprise a bubbling chamber for performing bubbling of the electrolytic solution in addition to the electrolysis chamber and the liquid surface level measuring chamber. The bubbling chamber does not comprise a cathode and anode for electrolysis or an electrode for liquid surface level detection, but comprises a bubbling gas feed section in the electrolytic solution for feeding gas by bubbling from outside of said bubbling chamber to the electrolytic solution in said bubbling chamber, and said bubbling gas feed section is connected via a piping to said bubbling gas feeding device that is placed outside of said bubbling chamber. By comprising a bubbling chamber for performing bubbling of the electrolytic solution in addition to the electrolysis chamber and the liquid surface level measuring chamber, inhibition of electrolysis due to attachment of bubbles to the cathode and/or anode is prevented in the electrolysis chamber, and the influence of shaking of the liquid surface of the electrolytic solution and chattering of the electrode for liquid surface level detection that may be caused by bubbling are avoided in the liquid surface level measuring chamber, thus allowing accurate detection of the liquid surface level.

Note that even when the device of the present invention comprises a bubbling chamber, a bubbling gas feed section connected to the bubbling gas feeding device may be further installed in the electrolytic solution in the electrolysis chamber. In other words, a bubbling gas feed section connected to the bubbling gas feeding device may be installed in both the bubbling chamber and the electrolysis chamber.

In one embodiment of the present invention, by adjusting the length of the gas piping and/or the electrolytic solution piping that joins each chamber, the positional relationship of each chamber can be freely altered. For example, by extending the gas piping and/or the electrolytic solution piping that joins the bubbling chamber and another chamber, transmission of shaking of the liquid surface or vibration of the electrode that accompanies the bubbling in the bubbling chamber to other chambers can be dampened.

The cathode and anode in the electrolysis chamber of the chlorine dioxide gas manufacturing device of the present invention are fixed by a spacer (sometimes referred to as an electrode fixture.) Said spacer keeps a predetermined interval between the cathode and the anode in order to prevent short circuiting of the cathode and anode, and said "predetermined interval" may be e.g. 1 mm-50 mm, preferably 2 mm-10 mm. The material of the spacer can be freely selected by those skilled in the art as long as it is a material that is not corroded by chlorine dioxide and is has insulation property, and e.g. vinyl chloride, fluorine resin, acrylic, and the like can be employed. Moreover, said spacer may be molded integrated with the electrolytic cell.

In the chlorine dioxide gas manufacturing device of the present invention, when the bubbling gas feed section is installed in the electrolysis chamber, said bubbling gas feed section is placed below said spacer, and said spacer is configured so that the bubbled gas is prevented from approaching the cathode and anode of the electrolysis chamber in the bottom portion thereof. By configuring in this way, inhibition of electrolysis caused by the gas bubbles fed from the bubbling gas feed section attaching to the cathode and anode can be prevented. Moreover, it is preferred that the spacer is configured so as not to inhibit the flow of the electrolytic solution in the electrolysis chamber, and is for example preferably configured so as not to inhibit the flow of the electrolytic solution in the direction from the section in the electrolysis chamber where the electrolytic solution is fed to the section where the electrolytic solution is discharged. In this way, holdup of the electrolytic solution is prevented, and the flow of the electrolytic solution in the vicinity of the cathode and anode can be improved.

The chlorine dioxide gas manufacturing device of the present invention may comprise an electrolytic solution feed tank for feeding the electrolytic solution to the electrolysis chamber. The electrolytic solution feed tank is connected to the electrolysis chamber via an electrolytic solution feed pipe. One aspect may take the configuration of feeding the electrolytic solution from the electrolytic solution feed tank to the electrolysis chamber with a liquid feed pump. Further, by setting up an integrating flowmeter on said electrolytic solution feed pipe, the amount of the electrolytic solution that was fed from the electrolytic solution feed tank to the electrolysis chamber can also be measured.

The chlorine dioxide gas manufacturing device of the present invention may comprise an electrolytic solution discharge tank for discharging the electrolytic solution that was employed for electrolysis. The electrolytic solution discharge tank is connected to the electrolysis chamber, the liquid surface level measuring chamber, and/or the bubbling chamber below the liquid surface of the electrolytic solution via an electrolytic solution discharge pipe. One aspect may take the configuration of discharging the electrolytic solution from the electrolysis chamber, the liquid surface level measuring chamber, and/or the bubbling chamber to the electrolytic solution discharge tank with a liquid discharge pump. Further, by setting up an integrating flowmeter on said electrolytic solution discharge pipe, the amount of the electrolytic solution that was discharged to the electrolytic solution discharge tank can also be measured.

In one embodiment of the present invention, by simultaneously monitoring the electrolytic current value measured with the electrode for electrolysis and/or the integrating flow value measured by the integrating flowmeters installed on the electrolytic solution feed pipe and the electrolytic solution discharge pipe, a system that adjusts the amount of the electrolytic solution fed or discharged so that the fluctuation of the electrolytic current value that accompanies the progression of electrolysis will be minimal can be made. For example, said system can be an automated control system employing a program that adjusts the amount of feeding or discharging the electrolytic solution so that said electrolytic current value will be within a certain range.

Moreover, in one embodiment of the present invention, an indicator is installed on the exterior of the device, and said indicator can display the electrolytic current value measured with the electrode for electrolysis and/or the integrating flow value of the electrolytic solution measured by the integrating flowmeters installed on the electrolytic solution feed pipe and the electrolytic solution discharge pipe.

The chlorine dioxide gas manufacturing device of the present invention may comprise a chlorine dioxide gas blower fan for releasing the chlorine dioxide gas produced in the device to outside of the device. The chlorine dioxide gas blower fan is connected to the electrolysis chamber and/or the liquid surface level measuring chamber above the liquid surface of the electrolytic solution via a chlorine dioxide gas release pipe. By installing the chlorine dioxide gas blower fan, chlorine dioxide gas produced in the device can be efficiently sent to outside of the device, and moreover, by adjusting the air volume of the fan, the amount of chlorine dioxide gas sent to outside of the device can also be adjusted. For example, when the amount of chlorine dioxide gas produced is relatively large, the air volume of the blower fan is turned up to diffuse chlorine dioxide gas outside of the device further away, and when the amount of chlorine dioxide gas produced is relatively small, the air volume of the blower fan is turned down to prevent chlorine dioxide gas outside of the device from being diffused more than necessary, to thereby allow adjustment so that chlorine dioxide gas concentration outside of the device will be within a certain range.

The chlorine dioxide gas manufacturing device of the present invention may comprise an activated carbon filter for efficiently adsorbing and capturing chlorine dioxide gas that had leaked into the space inside the device from the electrolysis chamber etc., and an air circulation fan for releasing said chlorine dioxide gas that had leaked into the space inside the device to outside of the device. The air circulation fan is installed on the outer frame of the chlorine dioxide gas manufacturing device of the present invention, and the activated carbon filter is installed along with said air circulation fan. For example, the configuration is preferably such that the air that passed through said activated carbon filter is discharged to outside of the device through the air circulation fan.

The terms used herein are employed for describing particular embodiments and do not intend to limit the invention.

Moreover, the term "comprising" as used herein, unless the content clearly indicates to be understood otherwise, intends the presence of the described items (such as components, steps, elements, or numbers), and does not exclude the presence of other items (such as components, steps, elements, and numbers).

Unless otherwise defined, all terms used herein (including technical and scientific terms) have the same meanings as those broadly recognized by those skilled in the art of the technology to which the present invention belongs. The terms used herein, unless explicitly defined otherwise, are to be construed as having meanings consistent with the meanings herein and in related technical fields, and shall not be construed as having idealized or excessively formal meanings.

The embodiments of the present invention may be described with reference to schematic diagrams. In such a case, they may be exaggerated in presentation in order to allow clear description.

In the present specification, for example, when expressed as "1-10 w/w %," those skilled in the art shall recognize that said expression refers individually and specifically to 1, 2, 3, 4, 5, 6, 7, 8, 9, or 10 w/w %.

In the present specification, unless explicitly indicated, any and all numeric values employed for indicating the component content or numeric value range is construed as encompassing the meaning of the term "about." For example, "10 folds," unless explicitly indicated, is understood to mean "about 10 folds."

All of the disclosures of the literatures cited herein should be deemed as cited herein, and those skilled in the art will cite and recognize the related disclosed contents in these prior art literatures as a part of the present specification according to the context herein without departing from the spirit and scope of the present invention.

The present invention will now be described in further detail with reference to Examples. However, the present invention can be embodied by various aspects, shall not be construed as being limited to the Examples described herein.

EXAMPLES

Manufacture Example 1: Chlorine Dioxide Gas Manufacturing Device

FIG. 1 is the schematic diagram of the inner structure of a chlorine dioxide gas manufacturing device which is one embodiment of the present invention. As shown in FIG. 1, the chlorine dioxide gas manufacturing device comprises an electrolysis chamber section 1 which comprises an electrolysis chamber 2 and a liquid surface level measuring chamber 3, and the electrolysis chamber 2 and the liquid surface level measuring chamber 3 are joined above the liquid surface of the electrolytic solution in the electrolysis chamber section 1 via a gas piping 6, and joined below the liquid surface of the electrolytic solution via an electrolytic solution piping 10. The electrolysis chamber 2 comprises an anode 18 and a cathode 19 for electrolysis, and the liquid surface level measuring chamber 3 comprises an electrode 20 for liquid surface level detection. The anode 18 and cathode 19 for electrolysis are fixed by a spacer 11. The electrolysis chamber 2 further comprises a bubbling gas feed section 5 in the electrolytic solution for feeding gas by bubbling to the electrolytic solution in the electrolysis chamber from outside of the electrolysis chamber, and the bubbling gas feed section 5 is connected via a piping to a bubbling gas feeding device 4 placed outside of the electrolysis chamber 2. Chlorine dioxide produced in the electrolytic solution by electrolysis is taken out by bubbling from the electrolytic solution into the air, and released via the gas piping 6 from a blower fan 21 to outside of the device. The electrolytic solution is fed from an electrolytic solution feed tank 12 via an electrolytic solution feed pipe 7 to the electrolysis chamber section 1, and discharged via an electrolytic solution discharge pipe 7' to an electrolytic solution discharge tank 13. The electrolytic solution feed pipe 7 comprises a liquid feed pump 14 for feeding the electrolytic solution in the electrolytic solution feed tank 12 to the electrolysis chamber section 1, and an integrating flowmeter 16 for measuring the amount of the electrolytic solution fed to the electrolysis chamber section 1. The electrolytic solution discharge pipe 7' comprises a liquid discharge pump 15 for discharging the electrolytic solution of electrolysis chamber section 1 to the electrolytic solution discharge tank 13, and an integrating flowmeter 16 for measuring the amount of the electrolytic solution discharged to the electrolytic solution discharge tank 13. The electrolytic current value measured by the anode 18 and cathode 19 for electrolysis and/or the value measured by the integrating flowmeter 16 are displayed on an indicator 17 installed on the device outer frame 22. Further, a trace amount of chlorine dioxide gas that had leaked out to outside of the electrolysis chamber section 1 is discharged to outside of the device by an air circulation fan 8 installed on the device outer frame 22. At this time, the chlorine dioxide gas is adsorbed by an activated carbon filter 9.

Manufacture Example 2: Two-Chamber Chlorine Dioxide Gas Manufacturing Device

Figure 2:
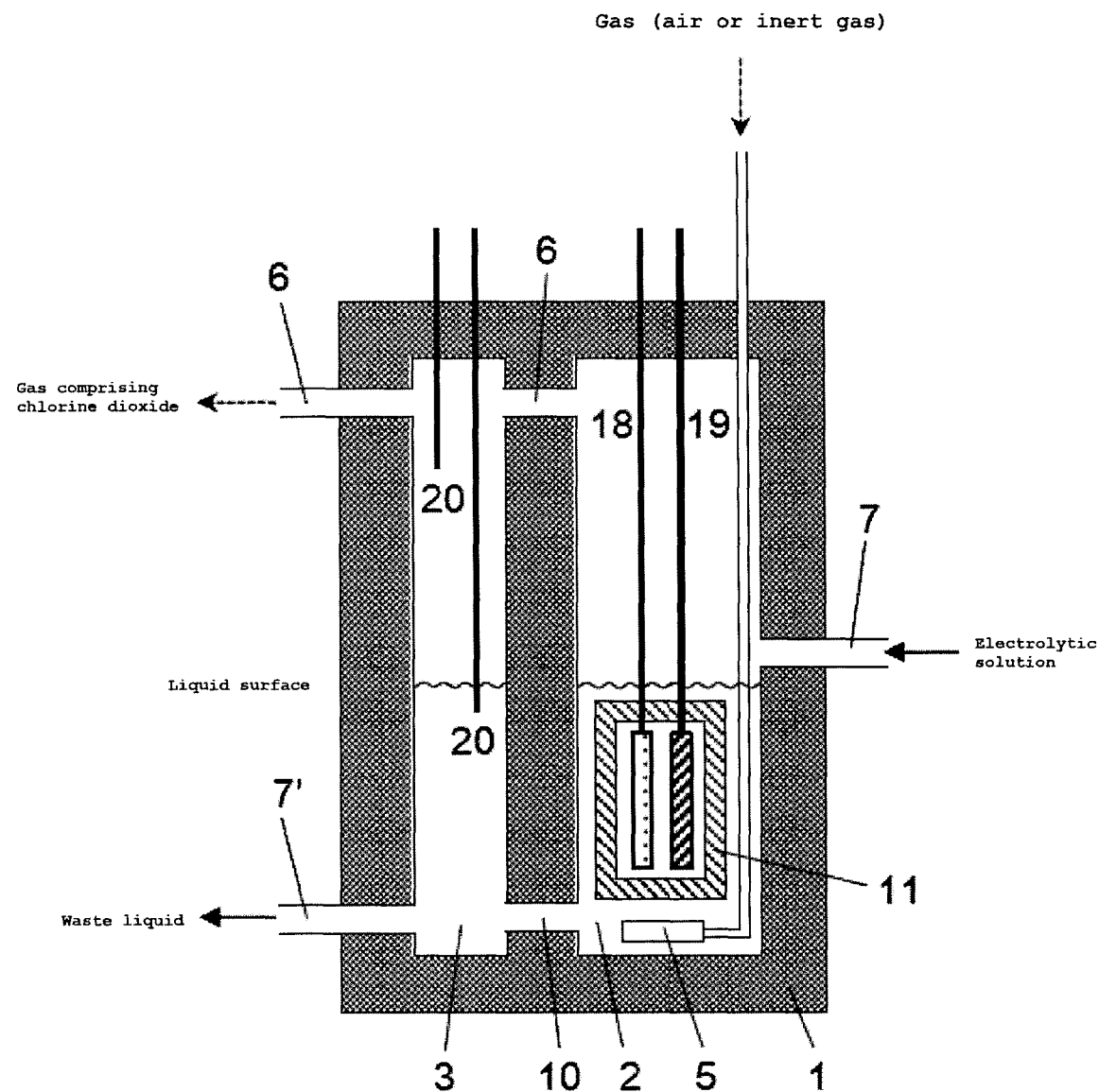
FIG. 2 shows the schematic diagram of the two-chamber chlorine dioxide gas manufacturing device which is one embodiment of the present invention.

FIG. 2 is the schematic diagram of the electrolysis chamber section 1 of a two-chamber chlorine dioxide gas manufacturing device which is one embodiment of the present invention. In the two-chamber chlorine dioxide gas manufacturing device, the electrolysis chamber 2 and the liquid surface level measuring chamber 3 are contained in the electrolysis chamber section 1, and the bubbling gas feed section 5 is installed below the anode 18 and cathode 19 for electrolysis. Further, the spacer 11 is configured to prevent the bubbled gas from approaching the anode 18 and the cathode 19.

Figure 3:
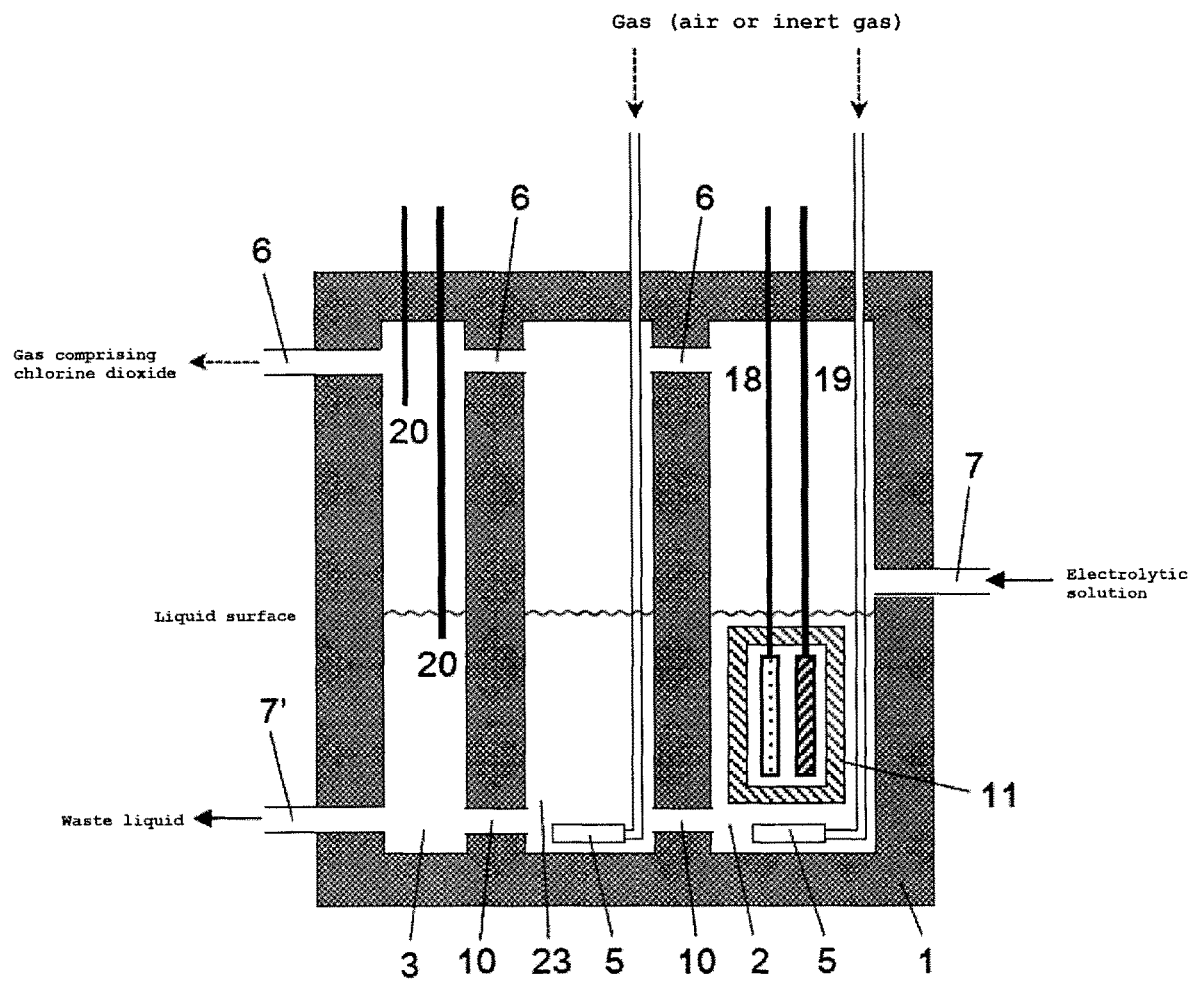
FIG. 3 shows the schematic diagram of the three-chamber chlorine dioxide gas manufacturing device which is one embodiment of the present invention.

Manufacture Example 3: Integrated Three-Chamber Chlorine Dioxide Gas Manufacturing Device FIG. 3 is the schematic diagram of the electrolysis chamber section 1 of a three-chamber chlorine dioxide gas manufacturing device which is one embodiment of the present invention. In the three-chamber chlorine dioxide gas manufacturing device, the electrolysis chamber 2, the liquid surface level measuring chamber 3, and the bubbling chamber 23 are contained in the electrolysis chamber section 1. The bubbling gas feed section 5 is installed below the anode 18 and cathode 19 for electrolysis and in the bubbling chamber 23.

Figure 4:
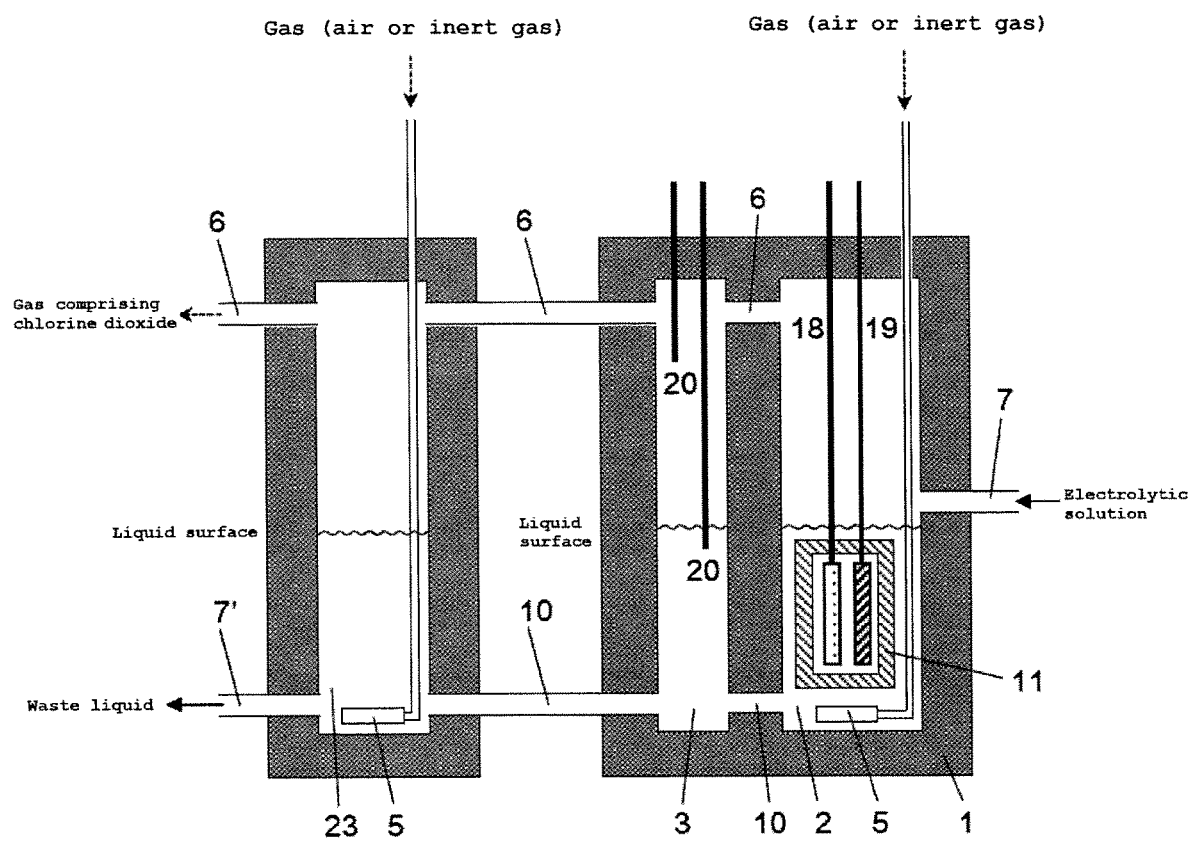
FIG. 4 shows the schematic diagram of the three-chamber chlorine dioxide gas manufacturing device which is one embodiment of the present invention.

Manufacture Example 4: Separated Three-Chamber Chlorine Dioxide Gas Manufacturing Device FIG. 4 is the schematic diagram of the electrolysis chamber section 1 and the bubbling chamber 23 of a chlorine dioxide gas manufacturing device of the type where the bubbling chamber 23 is separated from the electrolysis chamber section 1, which is one embodiment of the present invention. Although the bubbling chamber 23 is installed at a position that is separated from the electrolysis chamber section 1, it is joined to the electrolysis chamber 2 and/or the liquid surface level measuring chamber 3 by the gas piping 6 and the electrolytic solution piping 10. Other configurations are similar to those in Manufacture Example 3.

Manufacture Example 5: Spacer

Figure 5:
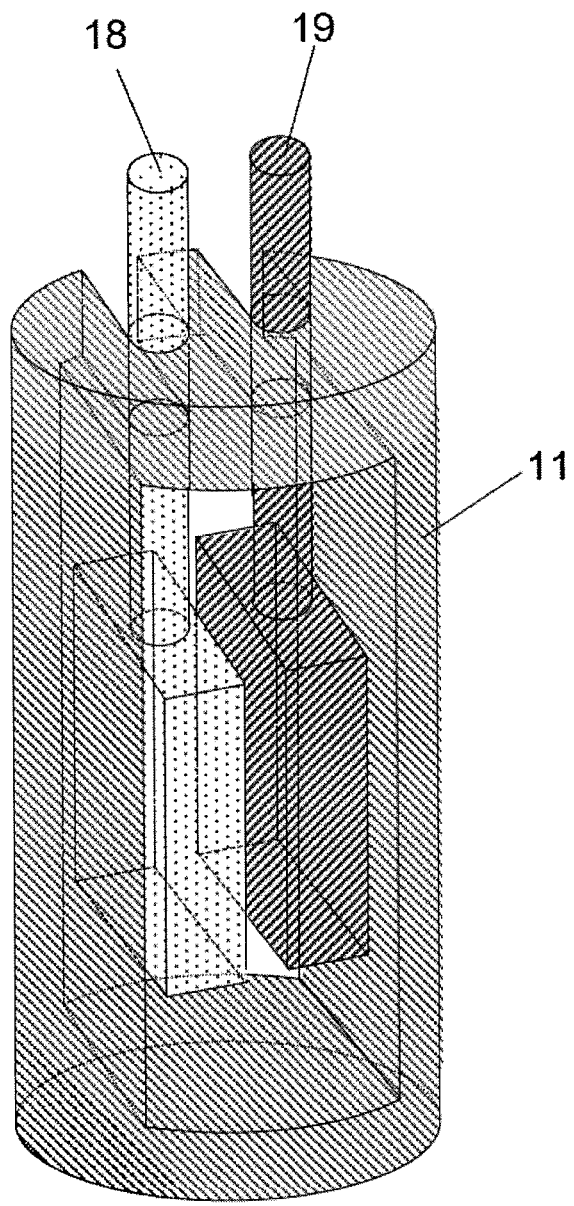
FIG. 5 shows the schematic diagram of the spacer in the chlorine dioxide gas manufacturing device which is one embodiment of the present invention.
Figure 6:
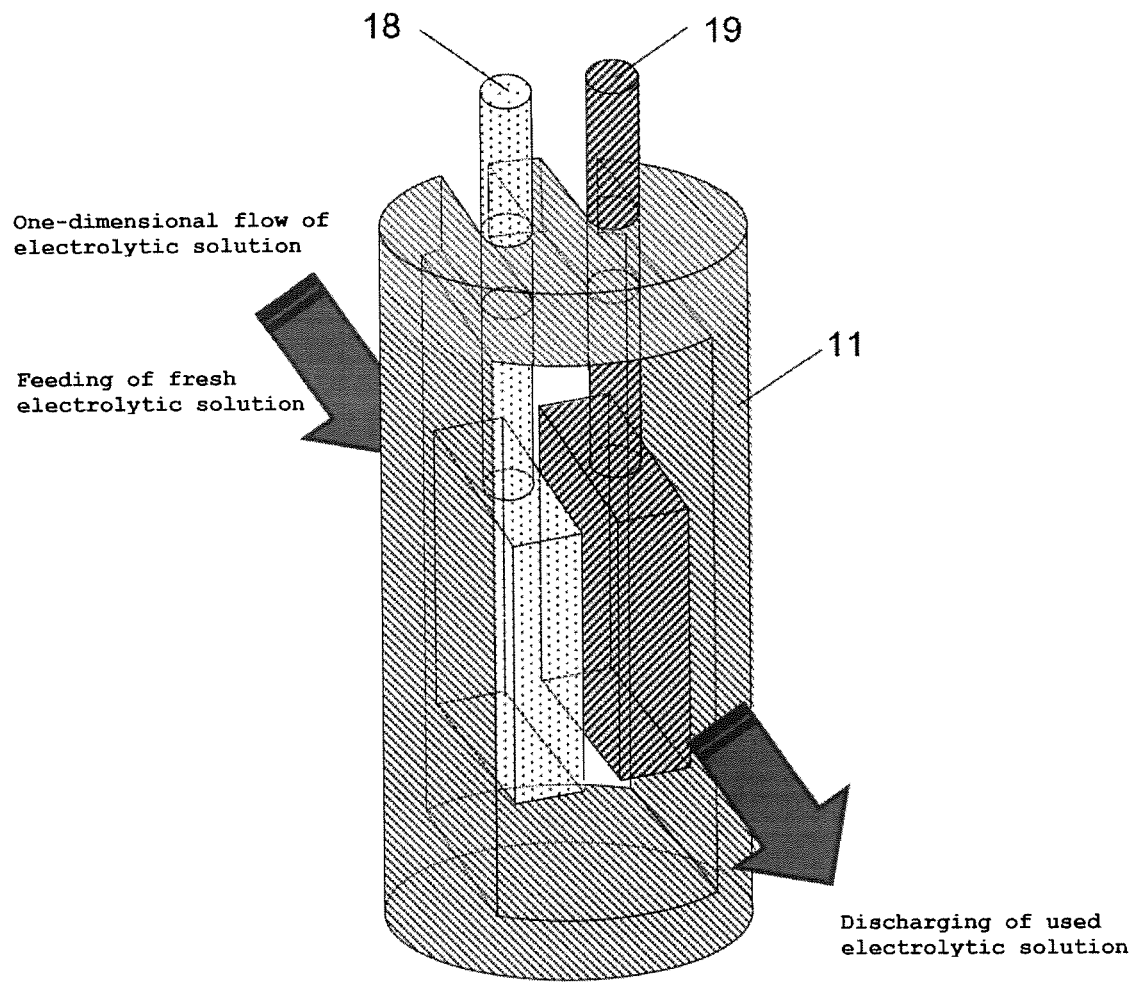
FIG. 6 shows the schematic diagram of the spacer in the chlorine dioxide gas manufacturing device which is one embodiment of the present invention.
Figure 7:
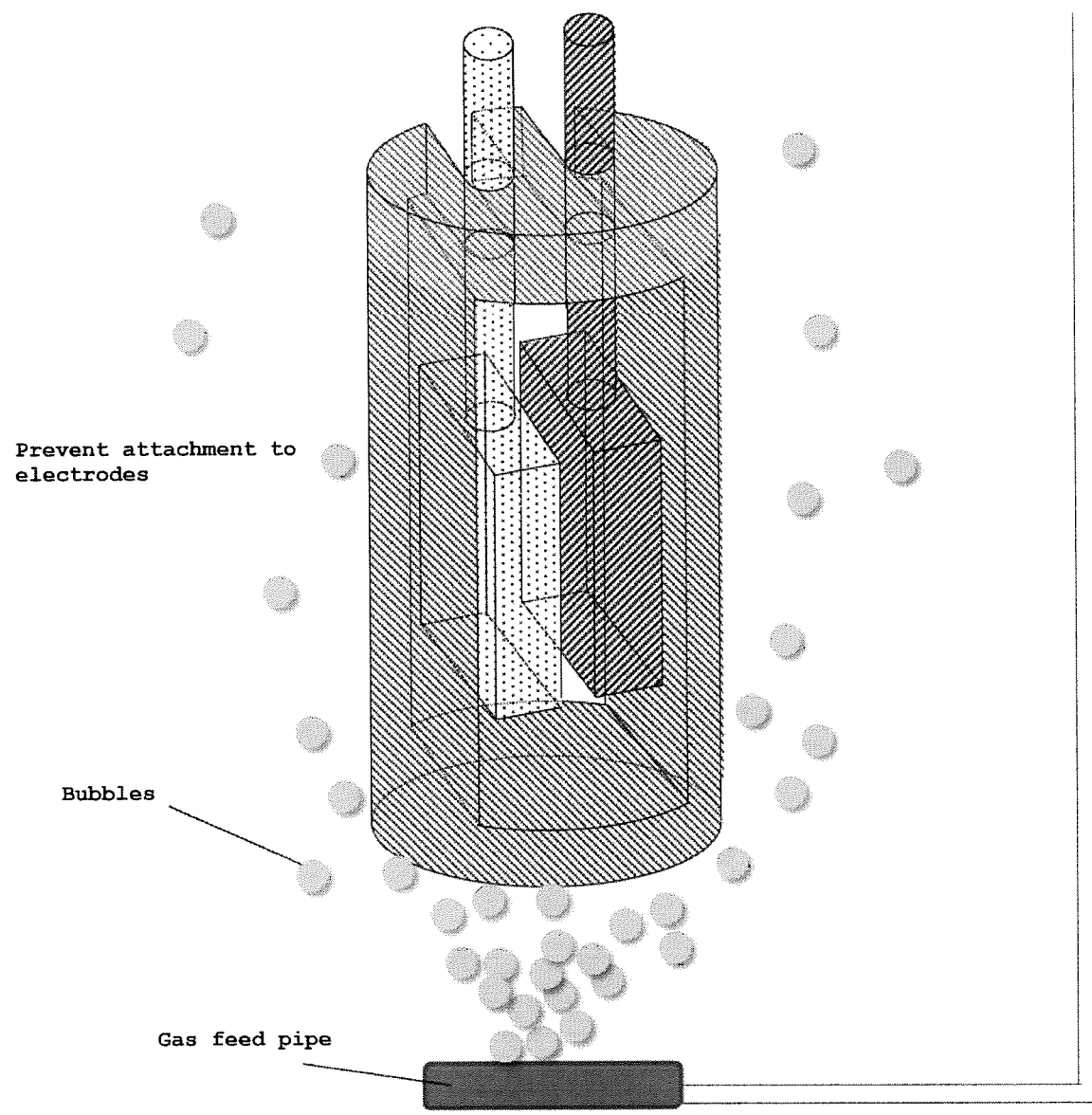
FIG. 7 shows the schematic diagram of the spacer in the chlorine dioxide gas manufacturing device which is one embodiment of the present invention.

FIGS. 5-7 are figures showing one embodiment of the spacer 11 employed in the present invention. The spacer 11 is fixed by gripping to the anode 18 and cathode 19 for electrolysis. Further, the spacer 11 is configured so as not to inhibit the flow of the electrolytic solution in the direction from the section where the electrolytic solution is fed to the section where the electrolytic solution is discharged in the electrolysis chamber (FIG. 6), and further configured so as to prevent the bubbled gas from approaching the cathode and anode of the electrolysis chamber (FIG. 7).

Example (Chlorine Dioxide Production Experiment)

A chlorine dioxide production experiment was performed by a chlorine dioxide gas manufacturing device fabricated based on FIG. 2.

A cylindrical shape electrolysis chamber (2) made of PVC containing the electrolytic solution comprises an anode (18), Pt/Ir calcined oxide titanium electrode (15 mm×50 mm) and a cathode (19), titanium electrode (15 mm×50 mm), as well as a spacer (11). Moreover, a liquid surface level measuring chamber (3) comprises an electrode for liquid surface level detection (20).

Moreover, a feed pipe (7) for feeding the supplementary electrolytic solution into the electrolysis chamber (2) and a electrolytic solution discharge pipe (7') for discharging the waste liquid from the liquid surface level measuring chamber (3) are each installed, and a bubbling gas feed section (5) for sending the aeration gas (air or inert gas) to the electrolytic solution in order to aerate the produced chlorine dioxide gas (dissolved gas) is installed in the electrolysis chamber (2).

In the electrolytic solution are formulated potassium chloride (alkali chloride), sodium chlorite (alkali chlorite), dipotassium hydrogenphosphate ($K_2HPO_4$) (pH adjustor), and potassium dihydrogenphosphate ($KH_2PO_4$) (acidic substance).

The feeding of the electrolytic solution during electrolysis was performed continuously or intermittently, and the discharging of the waste liquid was performed as follows. In other words, when the liquid surface reaches the tip position of the shorter of the electrodes for liquid surface level detection (20), it becomes an energized state, and the electrolytic solution (waste liquid) is discharged from the electrolytic solution discharge pipe (7'). When the liquid surface is lowered and reaches the tip position of the longer of the electrodes for liquid surface level detection (20), the longer of the electrodes for liquid surface level detection (20) becomes electrically disconnected, and with this, the discharging of the waste liquid from the electrolytic solution discharge pipe (7') is stopped. This will cause elevation of the liquid surface, and when the liquid surface reaches the tip position of the shorter of the electrodes for liquid surface level detection (20), the shorter of the electrodes for liquid surface level detection (20) becomes energized again, and the discharging of the waste liquid is resumed. Feeding and discharging of the electrolytic solution were performed in this way during electrolysis.

Electrolysis was performed employing the above device with the electric current at 30 mA and the electric current density at 0.4 A/dm$^2$, and the electrolytic solution was aerated with air at 25° C., 500 mL/min in order to take out (deaerate and collect) the chlorine dioxide gas.

In this way, manufacture of chlorine dioxide gas was performed for 40 hours, and as a result, chlorine dioxide gas was stably produced, and the produced chlorine dioxide gas concentration was 640 ppm, the amount produced per hour was 53 mg/h, and the production efficiency was 70.2%.

Comparative Example

In the above Example, when a similar experiment was performed with a device without a liquid surface level measuring chamber and having the electrode for liquid surface level detection in the electrolysis chamber, the liquid surface relay that is cooperative with the electrodes for liquid surface level detection stopped operating in about a day because chattering was caused due to the bubbles from the bubbling. The electrolytic solution overflowed from the gas piping (the discharge pipe of the produced gas) and the production efficiency could not be measured.

In other words, the present invention enabled appropriately controlling the liquid amount of the electrolytic solution while continuously producing chlorine dioxide gas without interruption in a chlorine dioxide generator by installing the electrolysis chamber and the liquid surface level measuring chamber separately and performing the aeration for taking out the dissolved chlorine dioxide gas produced by electrolysis from the electrolytic solution in a place other than in the liquid surface level measuring chamber.

In a traditional chlorine dioxide generator of the type where chlorine dioxide gas is collected by bubbling, there were problems such as that the electrolysis efficiency was reduced due to bubbles attaching to the electrode for electrolysis or the electrode for liquid surface level detection and the liquid surface level could not be accurately monitored, but these problems were solved by the present invention.

DESCRIPTION OF SYMBOLS

1 Electrolysis chamber section
2 Electrolysis chamber
3 Liquid surface level measuring chamber
4 Bubbling gas feeding device
5 Bubbling gas feed section
6 Gas piping
7 Electrolytic solution feed pipe
7' Electrolytic solution discharge pipe
8 Air circulation fan
9 Activated carbon filter
10 Electrolytic solution piping
11 Spacer
12 Electrolytic solution feed tank
13 Electrolytic solution discharge tank
14 Liquid feed pump
15 Liquid discharge pump
16 Integrating flowmeter
17 Indicator
18 Anode
19 Cathode
20 Electrode for liquid surface level detection
21 Chlorine dioxide gas blower fan
22 Device outer frame
23 Bubbling chamber

The invention claimed is:
1. A chlorine dioxide gas manufacturing device, comprising:
an electrolysis chamber, a liquid surface level measuring chamber, and a bubbling gas feeding device,
wherein the electrolysis chamber and the liquid surface level measuring chamber each comprises an electro- lytic solution and a gas, wherein the electrolytic solution comprises an aqueous chlorite solution, wherein the electrolysis chamber and the liquid surface level measuring chamber are joined to each other above each liquid surface via a gas piping and joined to each other below each liquid surface via an electrolytic solution piping so that heights of the electrolytic solutions contained in the electrolysis chamber and the liquid surface level measuring chamber are substantially equal to each other, wherein the electrolysis chamber comprises a cathode and an anode, wherein the cathode and the anode are fixed to a spacer, wherein the electrolysis chamber comprises a bubbling gas feed section in the electrolytic solution for feeding gas by bubbling from outside of the electrolysis chamber to the electrolytic solution in the electrolysis chamber, wherein the bubbling gas feed section is connected via a piping to the bubbling gas feeding device placed outside of the electrolysis chamber, wherein the liquid surface level measuring chamber comprises at least two electrodes having lengths that differ from each other, and wherein the bubbling gas feed section is placed below the spacer, and the spacer is configured so as to prevent the bubbled gas from attaching to the cathode and the anode at the bottom portion thereof.

2. The chlorine dioxide gas manufacturing device according to claim 1, wherein the spacer retains a predetermined interval between the cathode and the anode.

3. The chlorine dioxide gas manufacturing device according to claim 2, wherein the predetermined interval is 1 mm-50 mm.

4. The chlorine dioxide gas manufacturing device according to claim 1, further comprising a device for verifying whether each of the at least two electrodes is exposed to the liquid surface by measuring the electric current between the differing electrodes.

5. The chlorine dioxide gas manufacturing device according to claim 1, further comprising an electrolytic solution feed tank, and wherein the electrolysis chamber is connected to the electrolytic solution feed tank via an electrolytic solution feed pipe.

6. The chlorine dioxide gas manufacturing device according to claim 1, comprising an electrolytic solution discharge tank, wherein the electrolysis chamber and/or the liquid surface level measuring chamber is connected to the electrolytic solution discharge tank below the liquid surface via an electrolytic solution discharge pipe.

7. The chlorine dioxide gas manufacturing device according to claim 1, comprising a chlorine dioxide gas blower fan, and wherein the electrolysis chamber and/or the liquid surface level measuring chamber is connected to the chlorine dioxide gas blower fan above the liquid surface via a chlorine dioxide gas release pipe.

8. The chlorine dioxide gas manufacturing device according to claim 1, wherein a barrier membrane does not exist between the cathode and the anode.

* * * * *